United States Patent [19]
Hendi et al.

[11] Patent Number: 5,529,623
[45] Date of Patent: Jun. 25, 1996

[54] PIGMENTARY SOLID SOLUTIONS OF PYRROLO[3,4-C]PYRROLES AND QUINACRIDONES

[75] Inventors: Shivakumar B. Hendi, Newark; James B. Ganci; Edward E. Jaffe, both of Wilmington, all of Del.

[73] Assignee: Ciba-Geigy Corporation, Tarrytown, N.Y.

[21] Appl. No.: 314,018

[22] Filed: Sep. 28, 1994

[51] Int. Cl.⁶ .................................................. C09B 48/00
[52] U.S. Cl. .................... 106/495; 106/493; 106/494; 106/497; 106/498; 546/56; 548/453
[58] Field of Search ................................ 106/493, 494, 106/495, 498, 497; 548/453; 546/271

[56] References Cited

U.S. PATENT DOCUMENTS

| | | | |
|---|---|---|---|
| 3,160,510 | 12/1964 | Ehrich | 106/495 |
| 4,783,540 | 11/1988 | Bäbler | 548/453 |
| 4,810,304 | 3/1989 | Jaffe et al. | 106/494 |
| 5,145,524 | 9/1992 | Ganci | 106/495 |
| 5,194,088 | 3/1993 | Babler et al. | 106/495 |
| 5,380,870 | 1/1995 | Hari et al. | 106/498 |

Primary Examiner—Mark L. Bell
Assistant Examiner—Scott L. Hertzog
Attorney, Agent, or Firm—George R. Dohmann

[57] ABSTRACT

Binary and ternary pigmentary solid solutions are disclosed. The binary solid solutions are binary solid compounds consisting of 35–45 weight-percent unsubstituted DPP and 55–65 weight-percent dichloro DPP. The ternary solid solutions are guest-host solid solutions wherein the binary solid compound is the host and up to 30 weight-percent of a disubstituted quinacridone pigment is the guest. The binary and ternary solid solutions are useful as pigments for coloring high-molecular-weight organic materials; especially as replacements for perylene pigments in automotive finishes.

25 Claims, 5 Drawing Sheets

PIGMENTARY SOLID SOLUTIONS OF PYRROLO[3,4-C]PYRROLES AND QUINACRIDONES

SUMMARY

The present invention relates to pigmentary binary and ternary solid solutions, wherein the ternary solid solutions are guest-host solid solutions which consist of 1,4-diketo-3,6-diphenyl-pyrrolo[3,4-c]pyrrole (unsubstituted DPP), 1,4-diketo-3,6-bis(4-chlorophenyl)pyrrolo[3,4-c]pyrrole (dichloro DPP) and a disubstituted quinacridone pigment, especially 2,9-dichloroquinacridone, 2,9-dimethylquinacridone or 2,9-difluoroquinacridone, wherein a binary solid compound consisting of 35–45 weight-percent unsubstituted DPP and 55–65 weight-percent dichloro DPP functions as host. The present invention further relates to the preparation of the solid solutions and solid compounds, and to the use of the solid solutions and solid compounds as pigments.

BACKGROUND

In general, if a multi-component pigment shows an x-ray diffraction pattern that differs from the x-ray diffraction pattern of a physical mixture of its components, the pigment is called a solid solution. There are mainly two types of clearly-defined solid solutions, a "guest-host" type solid solution and a "solid compound" type solid solution.

A "guest-host" solid solution is a solid solution wherein the x-ray diffraction pattern of the solid solution is substantially identical to the x-ray diffraction pattern of one of the components, called the "host". The host component is said to accept the other component, the "guest", into its crystal lattice.

Solid compounds are solid solutions wherein the two components associate with each other to produce an x-ray diffraction pattern which is different from the x-ray diffraction pattern of any component or a physical mixture of the components.

Solid solutions and solid compounds of quinacridones are known in the art for their pigmentary properties. Quinacridone solid solutions and solid compounds are described in U.S. Pat. No. 3,160,510.

Solid solutions containing two or more of the diketopyrrolo[3,4-c]-pyrrole (DPP) series of pigments and their pigmentary properties are also known in the art and are generally disclosed in U.S. Pat. No. 4,783,540.

Solid solutions containing a DPP-type pigment and a pigment of another class, for example, a quinacridone or quinacridonequinone, are described in U.S. Pat. No. 4,810,304.

The present invention is based on the discovery that unsubstituted DPP and dichloro DPP form a binary solid compound within a narrow weight ratio range of from about 35 to 45 weight-percent of unsubstituted DPP and about 55 to 65 weight-percent of dichloro DPP. The present invention is further based on the discovery that the binary unsubstituted DPP/dichloro DPP solid compound readily accepts a disubstituted quinacridone pigment into its crystal lattice to form a ternary "guest-host" solid solution wherein the binary solid compound is the host. 2,9-Dichloroquinacridone, 2,9-dimethylquinacridone and 2,9-difluoroquinacridone are especially useful disubstituted quinacridone pigments which form ternary solid solutions. The binary and ternary solid solution pigments are particularly useful in both solvent and waterborne paint systems.

The inventive binary and ternary solid solutions are suitable as replacements for the perylene pigment, perylene tetracarboxylic acid dianhydride, in paint systems. This is significant because the perylene tetracarboxylic acid dianhydride is unstable in waterborne paint applications, while the present solid solutions are suitable for use in waterborne applications. Thus, the present solid solutions fill a void caused by the unsuitability of the perylene pigment in waterborne paint applications.

DETAILED DESCRIPTION

Figure 1:
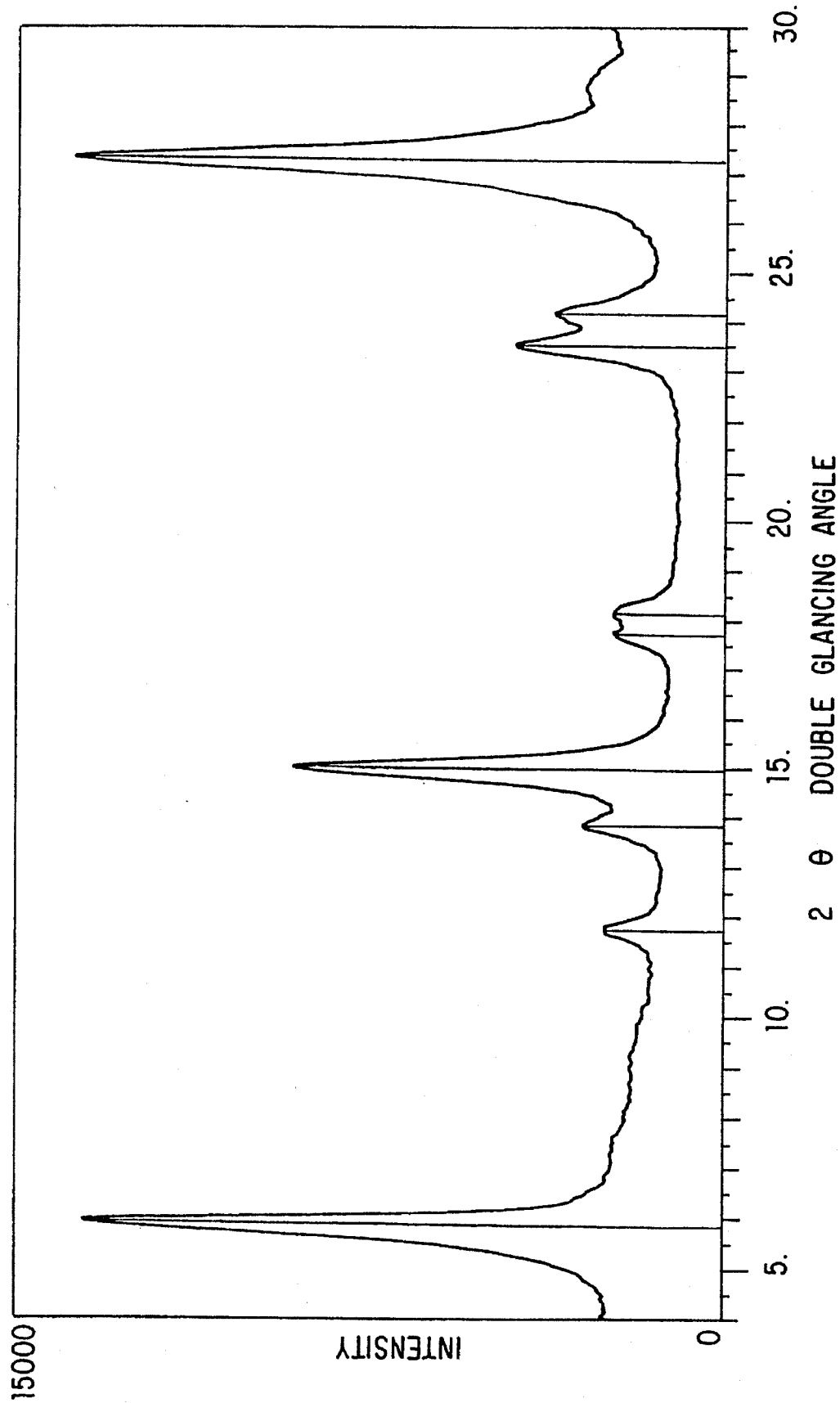
FIG. 1 shows the x-ray diffraction pattern of a binary solid compound which contains 40 weight-percent of unsubstituted DPP and 60 weight-percent of dichloro DPP.
Figure 2:
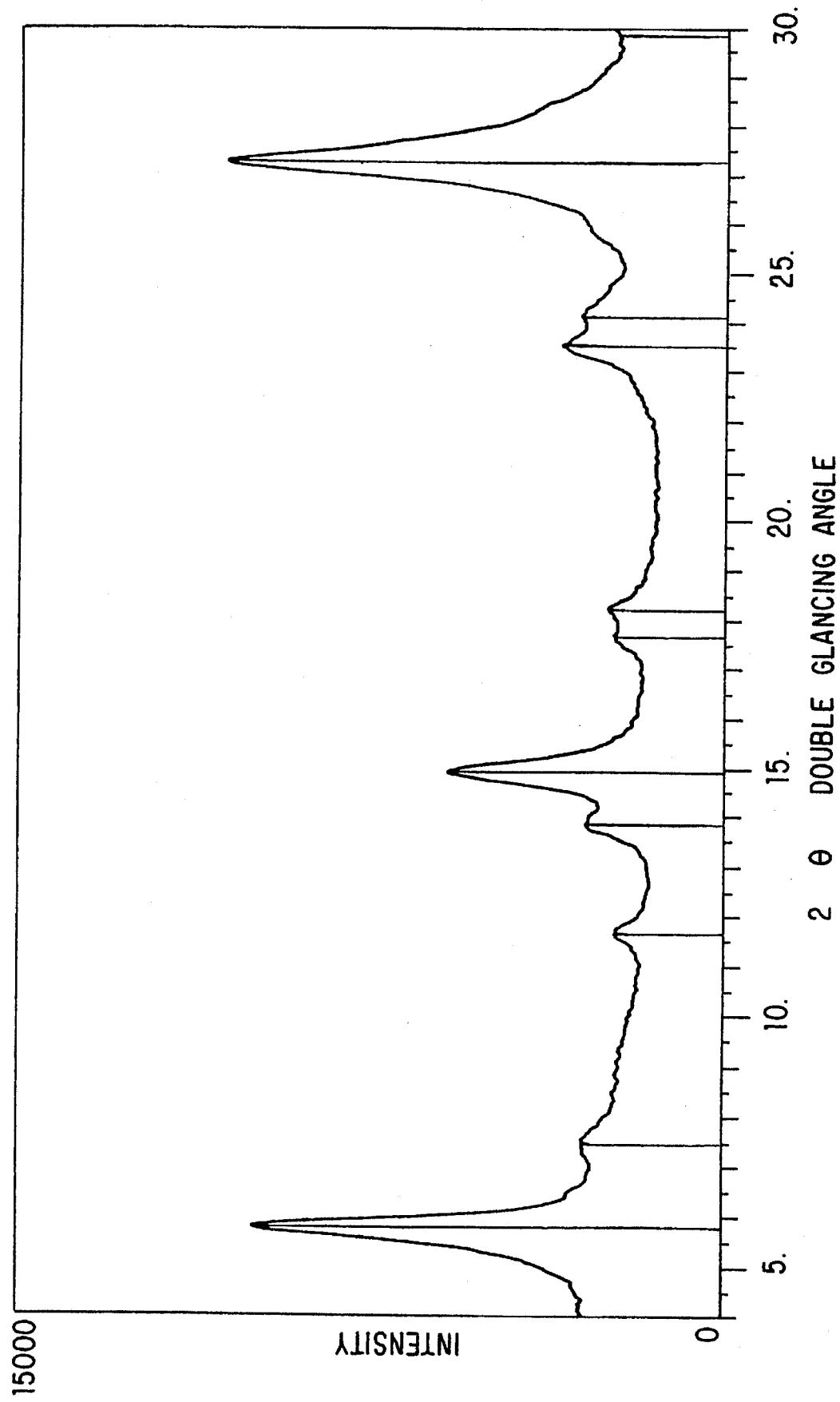
FIG. 2 shows the x-ray diffraction pattern of a ternary guest-host solid solution containing 20 weight-percent of 2,9-dichloroquinacridone and 80 weight-percent of a binary solid compound consisting of 60 weight-percent dichloro DPP and 40 weight-percent unsubstituted DPP (20 weight-percent 2,9-dichloroquinacridone, 48 weight-percent dichloro DPP and 32 weight-percent unsubstituted DPP).
Figure 3:
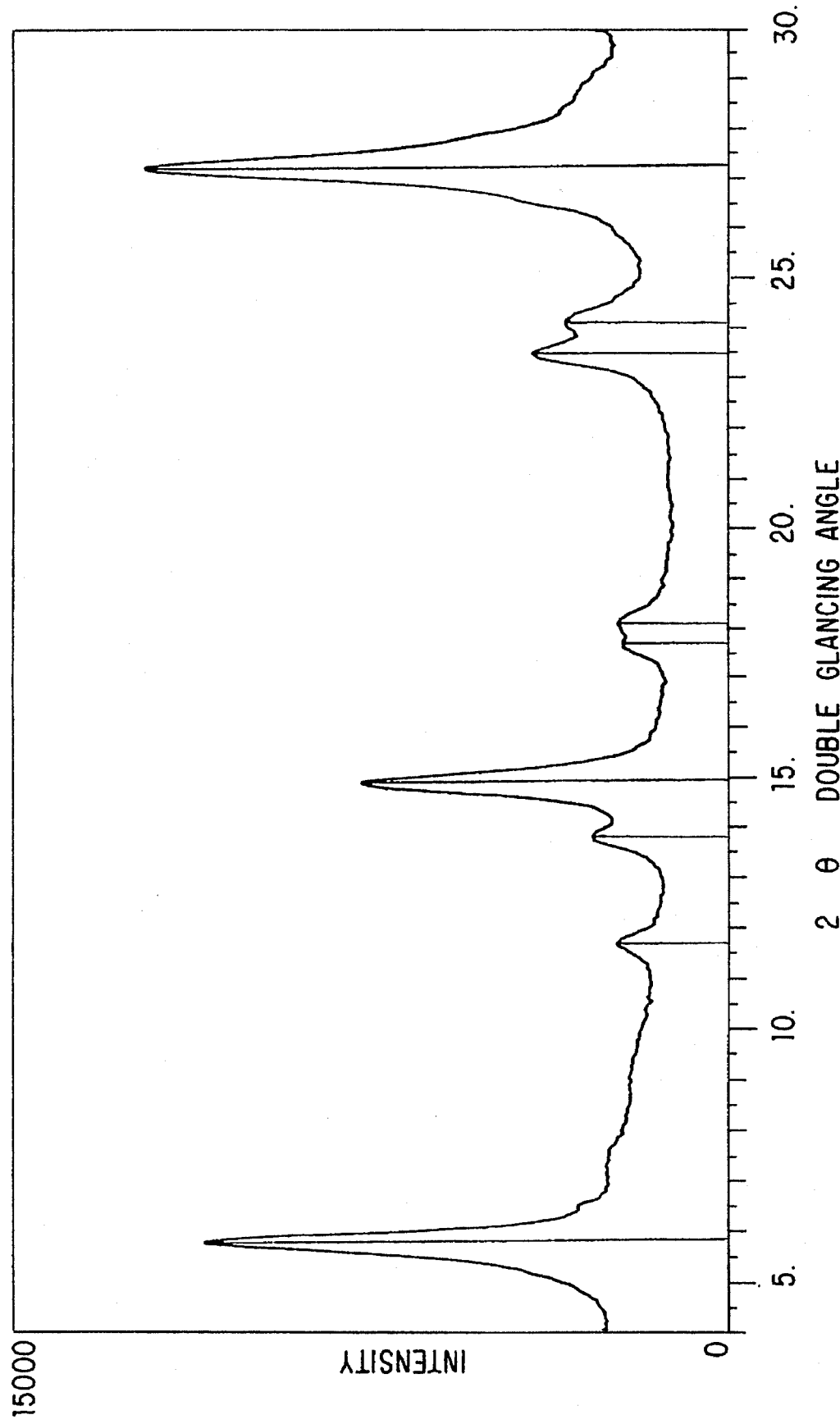
FIG. 3 shows the x-ray diffraction pattern of a ternary guest-host solid solution containing 20 weight-percent of 2,9-dimethylquinacridone and 80 weight-percent of a binary solid compound consisting of 60 weight-percent dichloro DPP and 40 weight-percent unsubstituted DPP (20 weight-percent 2,9-dimethylquinacridone, 48 weight-percent dimethyl DPP and 32 weight-percent unsubstituted DPP).
Figure 4:
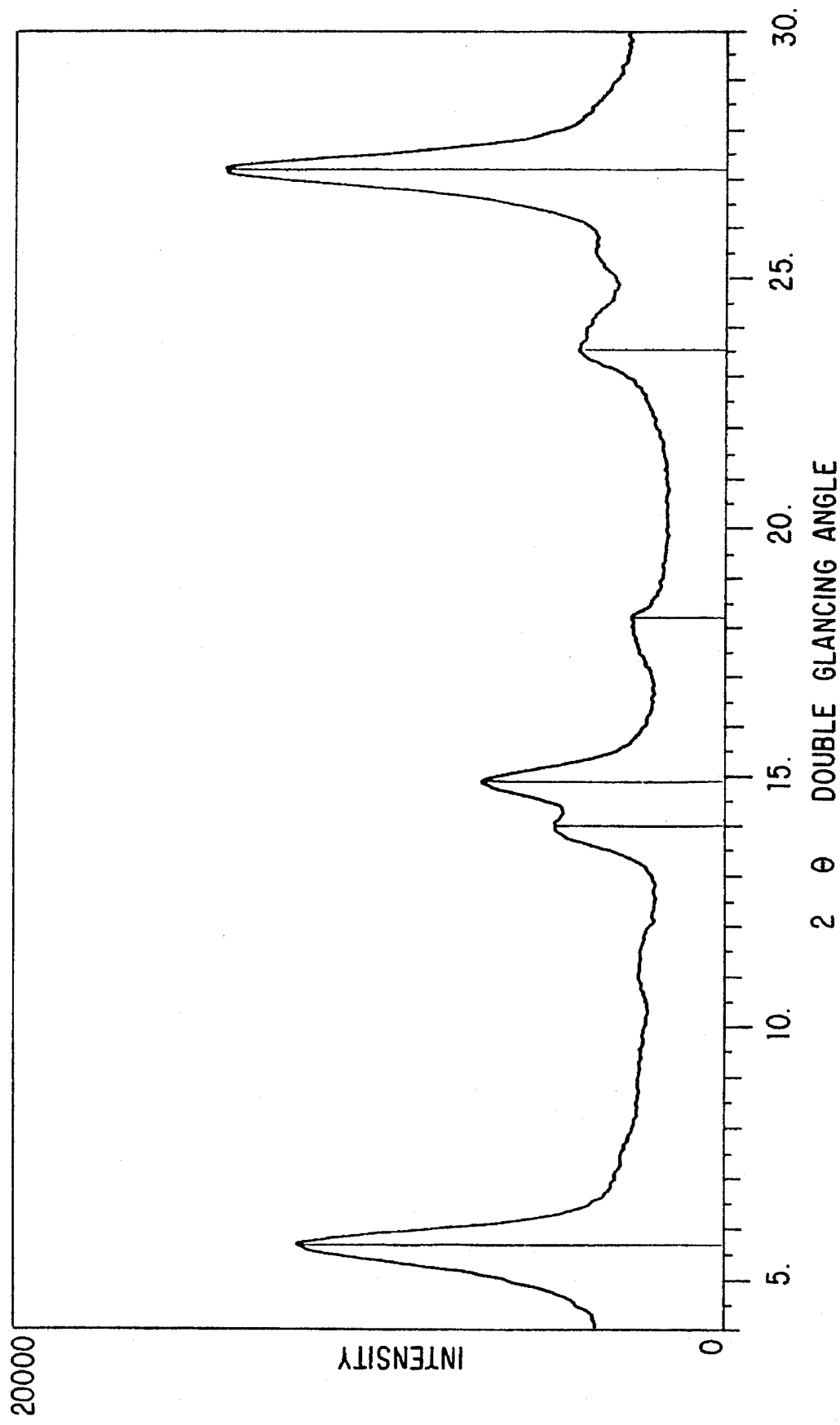
FIG. 4 shows the x-ray diffraction pattern of a ternary guest-host solid solution containing 30 weight-percent of 2,9-dimethylquinacridone and 70 weight-percent of a binary solid compound consisting of 60 weight-percent dichloro DPP and 40 weight-percent unsubstituted DPP (30 weight-percent 2,9-dimethylquinacridone, 42 weight-percent dichloro DPP and 28 weight-percent unsubstituted DPP).
Figure 5:
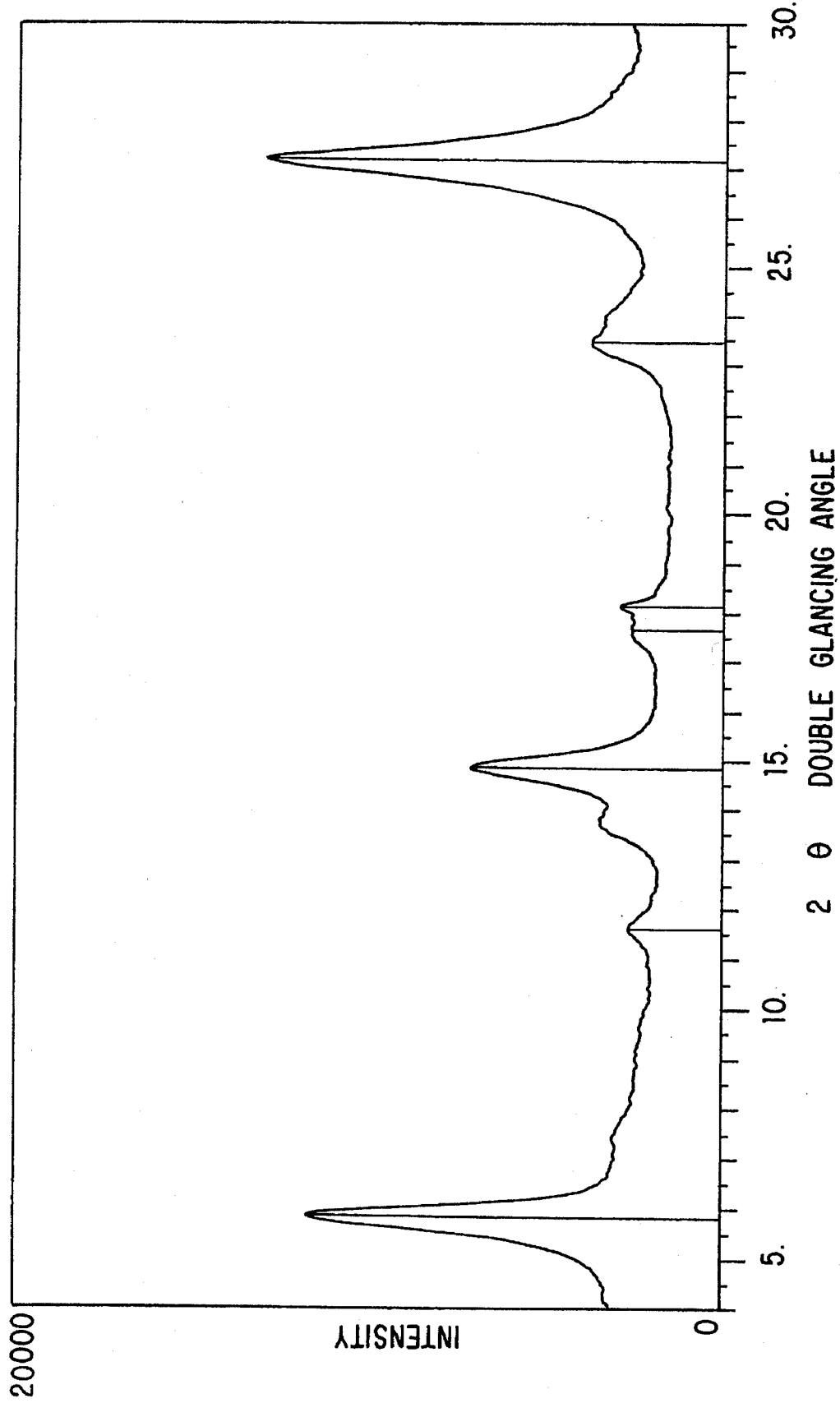
FIG. 5 shows the x-ray diffraction pattern of a ternary guest-host solid solution containing 20 weight-percent of 2,9-difluoroquinacridone and 80 weight-percent of a binary solid compound consisting of 60 weight-percent dichloro DPP and 40 weight-percent unsubstituted DPP (20 weight-percent 2,9-difluoroquinacridone, 48 weight-percent dichloro DPP and 32 weight-percent unsubstituted DPP).

The present invention relates to binary and ternary pigmentary solid solutions.

The binary solid solution is a binary solid compound consisting of from about 35 to 45 weight-percent of 1,4-diketo-3,6-diphenyl-pyrrolo[3,4-c]pyrrole (unsubstituted DPP) and from about 55 to 65 weight-percent of 1,4-diketo-3,6-bis(4-chlorophenyl)-pyrrolo[3,4-c]pyrrole (dichloro DPP). The binary solid compounds are characterized by a new strong peak corresponding to a 2θ double glancing angle of about 5.9, in particular, 5.9±0.1, in their x-ray diffraction patterns. The x-ray diffraction patterns of the binary solid compounds have peaks corresponding to 2θ double glancing angles of 5.9±0.1, 11.8±0.1, 13.9±0.1, 15.0±0.1, 17.8±0.1, 18.2±0.1, 23.5±0.1, 24.1±0.1 and 27.3±0.1.

The present invention also relates to ternary solid solutions. The ternary solid solutions are guest-host solid solutions which consist of from 70 to 99.9 weight-percent of a host, which is a binary solid compound consisting of from about 35 to 45 weight-percent of unsubstituted DPP and from about 55 to 65 weight-percent of dichloro DPP, and from 0.1 to 30 weight-percent of a guest which is a disubstituted quinacridone pigment. Since the ternary solid solution is a guest-host type solid solution, wherein the binary solid compound is the host, both the binary solid compound and the ternary solid solution have nearly identical x-ray diffraction patterns with a strong peak corresponding to the peak at the 5.9 2θ double glancing angle of the binary solid solution host. However, in the case of the ternary solid solutions, the peak is found within the somewhat broader range of 5.9±0.3, usually within the range 5.9±0.2. Likewise, the ternary solid solutions also have peaks corresponding to the peaks found in the binary solid solutions at 2θ double glancing angles of 5.9, 11.8, 13.9, 15.0, 17.8, 18.2, 23.5, 24.1 and 27.3, each peak varying within ±0.3 2θ double glancing angles, preferably ±0.2 2θ double glancing angles.

The x-ray diffraction peak at about 5.9 2θ double glancing angle is especially characteristic of the present binary and ternary solid solutions.

Disubstituted quinacridone pigments, in particular 2,9-disubstituted and 4,11-disubstituted quinacridone pigments, are well-known in the pigments art. Especially useful ternary solid solutions are those wherein the disubstituted quinacridone pigment is a 2,9-disubstituted quinacridone pigment selected from the group consisting of 2,9-dichloroquinacridone, 2,9-dimethylquinacridone and 2,9-difluoroquinacridone.

In the case of ternary solid solutions containing 2,9-dichloroquinacridone or 2,9-difluoroquinacridone as the disubstituted quinacridone pigment, the peak is usually found within the same range as in the binary solid solution host, 5.9±0.1 2θ double glancing angle.

Although the same is generally true of ternary solid solutions containing 2,9-dimethylquinacridone as the disubstituted quinacridone pigment, the peak at 5.9 2θ double glancing angle is usually shifted to a somewhat lower double glancing angle at higher concentrations of 2,9-dimethylquinacridone. For example, in the composition containing dichloro DPP/unsubstituted DPP/2,9-dimethylquinacridone in the weight ratio 54/36/10, the first peak appears at 5.8 2θ double glancing angle. When the weight ratios are changed to 42 parts dichloro DPP/28 parts unsubstituted DPP/30 parts 2,9-dimethylquinacridone, the first peak is shifted to 5.7 2θ double glancing angle.

In general, increasing the level of the disubstituted quinacridone pigment results in a more transparent, smaller particle size, ternary solid solution. The increasing transparency is related to an increased width at half height (β½) of the peak at 5.9 2θ double glancing angle. Thus, an increased β½ indicates a more transparent pigment.

Particularly useful ternary guest-host solid solutions of the present invention contain from 10 to 25 weight-percent of the disubstituted quinacridone pigments, especially 10 to 25 weight-percent of 2,9-dichloroquinacridone, 2,9-difluoroquinacridone or 2,9-dimethylquinacridone. In a particularly useful embodiment, the ternary guest-host solid solution contains from 10 to 25 weight-percent of the disubstituted quinacridone pigment and from 75 to 90 weight-percent of the binary solid solution which consists of about 40 weight-percent of unsubstituted DPP and about 60 weight-percent of dichloro DPP.

Like many other pigments, both the binary and ternary solid solution pigments of the present invention are advantageously surface treated by known methods to improve their performance in a variety of automotive and other finish systems and in other applications.

Both the binary and ternary solid solutions are advantageously utilized as components of a pigment composition. In general, the pigment composition comprises, in addition to the solid solution, at least one additional component selected from the group consisting of an antiflocculating agent, a dispersant, a viscosity-modifying agent and a texture improving agent.

Quinacridone sulfonic acid or its salts, DPP sulfonic acid and its salts, pyrazolylmethylquinacridone, 2-pthalimidomethylquinacridone and other similar derivatives are suitable as additive antiflocculating agents.

Polymeric dispersants, especially polyurethane-type polymeric dispersants, are particularly suitable as dispersants in the pigment compositions.

Suitable viscosity-modifying agents include quinacridone sulfonic acids, diketopyrrolopyrrole sulfonic acids, a pyrazolylmethylquinacridone, a pyrazolylmethyldiketopyrrolopyrrole, a dimethylaminopropylquinacridone monosulfonamide, a dimethylaminopropylquinacridone disulfonamide, a phthalimidomethylquinacridone, a phthalimidomethyl DPP and mixtures thereof and salts of the acids; in particular quinacridone sulfonic acid or a salt thereof, especially the aluminum salt, and pyrazolylmethylquinacridone and mixtures thereof.

Any texture improving agent is suitable as an additional component of the present pigment compositions to improve dispersability and performance in plastic systems; the calcium salt of abietic acid being particularly suitable.

The binary and ternary solid solutions of the present invention and pigment compositions containing the binary and ternary solid solutions are particularly useful as pigments for coloring high-molecular-weight organic materials. Therefore, the present invention further relates to a method of coloring a high-molecular-weight organic material which comprises incorporating an effective pigmenting amount of a binary or ternary solid solution of the present invention into the high-molecular-weight organic material.

In general, an effective pigmenting amount is any amount which results in the desired coloristic properties in the final pigmented material. In general, an effective pigmenting amount is from about 0.005 to about 30 weight-percent, preferably 0.01 to 10 weight-percent, of the pigment.

The present binary and ternary solid solutions are particularly useful for coloring high-molecular-weight organic materials that are used as coatings, in particular solventborne and waterborne paints. Acrylics, alkyds, polyesters, polyurethanes and combinations thereof are particularly useful as the high-molecular-weight organic material. The binary and ternary solid solutions possess excellent tinctorial strength, excellent durability characteristics and exceptionally high color saturation when used in coating applications, in particular in automotive finishes.

The solid solutions of the present invention are also useful for coloring plastics, in particular polyvinyl chloride and polyolefins, such as polyethylene and polypropylene.

In the above-described methods of coloring high-molecular-weight organic material, it is advantageous to utilize the binary and ternary solid solutions in the form of pigment compositions as discussed above; especially pigment compositions that comprise a viscosity-modifying agent, antiflocculating agent and/or texture-improving agent as an additional component.

The binary and ternary solid solutions according to the invention are advantageously prepared by acid precipitation or milling starting from the large particle size crude pigments corresponding to the individual components of the solid solution.

In an acid precipitation procedure, the components of the solid solution are dissolved in concentrated acid, for example concentrated sulfuric or polyphosphoric acid, and subsequently precipitated by drowning the acid solutions in a suitable precipitating solvent, preferably water. After a ripening step, the solid solution is isolated by customary procedures, for example by filtration followed by drying.

Preferably, the present solid solutions are prepared by milling methods wherein a binary component mixture consisting of unsubstituted DPP and dichloro DPP, or a ternary component mixture consisting of unsubstituted DPP, dichloro DPP and a disubstituted quinacridone pigment, is milled by conventional dispersion milling methods for an extended period of time ranging from 5 to 30 hours, for example, greater than 15 hours, in particular, 24 or more hours. The milling period required depends on the particle size of the pigment crudes, with larger particle crudes requiring a longer milling period.

Particularly suitable dispersion milling methods use dry salt as a milling medium at about a 1:4 pigment to salt ratio, with or without small amounts of organic solvents or milling aids. The dry salts used in the grinding include sodium chloride, calcium chloride, sodium sulfate or aluminum sulfate with or without water of crystallization. For example, for every 10 parts of pigment component mixture, 40 parts of hydrated aluminum sulfate is used. It can be of advantage to include small amounts of a variety of organic solvents, such as high boiling hydrocarbons and dibasic esters, in particular dimethyl succinate and/or dimethyl glutarate, in the milling media. The milling aids include metal, glass or ceramic balls, plastic granules or sand grains. Additionally, a surfactant is optionally added to the milling recipe. Useful surfactants include sodium or isopropylammonium salts of dodecyl benzenesulfonic acid or decyl trimethylammonium chloride. The workup involves separating the mixture of pigment and salt from the milling aids followed by dilute acid extraction and isolation of the pigment by filtration.

The present binary and ternary solid solutions are also prepared by other pigment development procedures, wherein the individual components are premilled to subpigmentary particle size and then subjected to a crystal growth step. Premilling is a simple process which involves milling 95 to 50 parts of the individual components together with 5 to 50 parts of the above mentioned salts. The crystal growth steps are generally referred to as ripening steps. Thus, in a premilling-ripening process the premilled pigment is optionally ripened in the presence of an acid or a base. For instance, small particle size pigments can be readily crystallized using a mixture of water, a water-miscible but distinctly second-phase-forming solvent, such as pentanol, and a base, for example, aqueous sodium hydroxide. The degree of pigment crystal growth depends on the duration and the temperature of ripening. Thus, the present invention also relates to a method of preparing the binary or ternary solid solutions, which comprises premilling the components of the solid solution, and subsequently subjecting a mixture of the premilled components to a crystal growth step.

The following examples further illustrate, but do not limit, various aspects of the present invention. All parts given are parts by weight.

EXAMPLE 1

Dichloro DPP (6.0 g.), unsubstituted DPP (4.0 g.), dimethyl glutarate (1.0 g.) and aluminum sulfate $(Al_2(SO_4)_3 6$ 15–18 $H_2O$; 40.0 g.) are added to a 1000 ml ball mill containing steel balls (1500 g.; 1.2 cm diameter) and nails (150 g.; 3.0 cm length) as grinding media. The mill is rolled on a roller mill for 24 hours. Then the contents of the mill are discharged and separated from the milling media. The mill powder thus obtained is stirred with 2% aqueous sulfuric acid (500 ml) for 2 hours at 90° C. The resulting pigment slurry is filtered and washed with hot water until neutral and free of salts. The filter cake is dried at 80° C.

The resulting pigment shows an x-ray diffraction pattern that is significantly different from that of the physical mixture of the two ingredients. A new peak at 5.9 2θ is prominent and the typical 6.5 2θ peak characteristic of unsubstituted DPP is completely absent. The resulting pigment shows the unique x-ray diffraction pattern of the inventive binary solid compound. By rubout, the pigment is close in color to a transparent red pigment based on the dianhydride of perylene tetracarboxylic acid. The pigment exhibits high saturation and excellent two-tone in a high solids automotive paint system.

EXAMPLE 2

A mixture of 10.0 g of the pigment prepared according to Example 1.100.0 ml of water, 10.0 g of aqueous sodium hydroxide (50%) and 4.0 ml of pentanol are stirred at 90° C. for 2 hours. The pentanol is removed by steam distillation and the pigment is filtered, washed to pH 7.0 and dried at 80° C.

The resulting pigment has an x-ray pattern similar to that of Example 1. However, the pigment has a larger particle size as is evident by the smaller β½ of the 5.9 2θ peak.

EXAMPLE 3

Example 1 is repeated except that 5.0 g each of the dichloro DPP and unsubstituted DPP are used.

The resulting pigment is a mixture of the new solid compound type solid solution and an excess of unsubstituted DPP. By rubout the pigment shows a lighter masstone and a yellower tint than the pigment of Example 1. In a high solids automotive paint system the pigment exhibits high saturation and very good lightfastness.

EXAMPLE 4

Example 1 is repeated with 5.4 g of dichloro DPP, 3.6 g of unsubstituted DPP and 1.0 g of 2,9-dichloroquinacridone.

The resulting ternary solid solution pigment has the x-ray pattern of the binary solid compound of Example 1 with a β½ of the 5.9 2θ peak of 0.486. The pigment is close in color to perylene tetracarboxylic acid dianhydride pigment and is slightly bluer than the binary solid compound of Example 1.

EXAMPLE 5

Example 4 is repeated with 4.8 g of dichloro DPP, 3.2 g of unsubstituted DPP and 2.0 g of 2,9-dichloroquinacridone.

The resulting ternary solid solution pigment shows an x-ray pattern of the binary solid compound of Example 1 with a β½ of the 5.9 2θ peak of 0.527. The pigment is a close color match to perylene tetracarboxylic acid dianhydride pigment and is slightly bluer than the pigments of Example 3 and Example 4.

EXAMPLE 6

Example 1 is repeated with 4.2 g of dichloro DPP, 2.8 g of unsubstituted DPP and 3.0 g of 2,9-dichloroquinacridone.

The resulting ternary solid solution pigment shows an x-ray pattern of the binary solid compound of Example 1, with a β½ of the 5.9 2θ peak of 0.564. The pigment is slightly bluer than the pigment of Example 5.

EXAMPLE 7

A mixture of 92 parts of the presscake of the pigment prepared according to Example 5 and 4 parts each of pyrazolylmethylquinacridone and the aluminum salt of quinacridone monosulfonic acid are blended to uniformity, filtered, washed to pH 7.0, dried and then pulverized to prepare a pigment composition which demonstrates excellent rheological characteristics in solvent- or water-borne paint systems.

EXAMPLE 8

Dichloro DPP (4.8 grams), unsubstituted DPP (3.2 grams) and 2,9-dimethylquinacridone (2.0 grams), dimethylglutarate (1.0 grams) and aluminum sulfate ($Al_2(SO_4)_3$. 15–18 $H_2O$) (40.0 grams) are added to a 1000 ml ball mill containing steel balls (1500 grams, 1.2 cm diameter) and nails (150 grams, 3 cm length). The mill is closed and rolled on a roller mill for 24 hours. The contents of the mill are then discharged and separated from the milling media. The mill powder is stirred with 2% aqueous sulfuric acid (500 ml) for 2 hours at 90° C. The resulting pigment slurry is filtered, washed with hot water until neutral and free of salts and dried at 80° C.

The resulting ternary solid solution is close in color to perylene tetracarboxylic acid dianhydride pigment and shows an x-ray pattern very similar to the host dichloro DPP/unsubstituted DPP solid compound.

EXAMPLE 9

Example 8 is repeated with the following weight ratio of components: 5.4 grams of dichloro DPP, 3.6 grams of unsubstituted DPP and 1.0 grams of 2,9-dimethylquinacridone. A similar ternary solid solution having an x-ray pattern with a peak at 5.8 2θ double glancing angle is obtained.

EXAMPLE 10

Example 8 is repeated with the following weight ratio of components: 4.2 grams of dichloro DPP, 2.8 grams of unsubstituted DPP and 3.0 grams of 2,9-dimethylquinacridone. A similar ternary solid solution pigment having an x-ray pattern with a peak at 5.7 2θ double glancing angle is obtained.

EXAMPLE 11

Dichloro DPP (4.8 grams), unsubstituted DPP (3.2 grams) and 2,9-difluoroquinacridone (1.0 grams), dimethylglutarate (1.0 grams) and aluminum sulfate ($Al_2(SO_4)_36$ 15–18 $H_2O$) (40.0 grams) are added to a 1000 ml ball mill containing steel balls (1500 grams, 1.2 cm diameter) and nails (150 grams, 3 cm length). The mill is closed and rolled on a roller mill for 24 hours. The contents of the mill are then discharged and separated from the milling media. The mill powder is stirred with 2% aqueous sulfuric acid (500 ml) for 2 hours at 90° C. The resulting pigment slurry is filtered, washed with hot water until neutral and free of salts and dried at 80° C.

The resulting ternary solid solution is close in color to perylene tetracarboxylic acid dianhydride pigment and shows an x-ray pattern very similar to the host dichloro DPP/unsubstituted DPP solid compound.

EXAMPLE 12

Example 11 is repeated using 2.0 grams of the 2,9-difluoroquinacridone instead of 1.0 grams. The resulting ternary solid solution is close in color to perylene tetracarboxylic acid dianhydride pigment and shows an x-ray pattern very similar to the host dichloro DPP/unsubstituted DPP solid compound.

EXAMPLE 13

Solvent-based paint formulation

Pigment Dispersion:

(a) A pint jar is charged with 26.4 g of the pigment composition of Example 7, 66.0 g of an acrylourethane resin, 14.4 g of a dispersant resin and 58.2 g of a solvent (thinner). The mixture is milled using 980 g of grinding media for 64 hours to prepare a pigment base containing 16% pigment and 48% solids at a pigment to binder ratio of 0.5.

Aluminum Base:

An aluminum base is obtained by mixing 405 g of aluminum paste (SPARKLE SILVER 5242-AR from SILBERLINE) with 315 g of acrylic dispersion resin and 180 g of acrylic resin in a quart can with an air mixer at slow to medium speed until lump-free (1–2 hrs.).

Mica Base

A mica base is prepared by mixing 251.1 g of mica with 315 g of acrylic dispersion resin and 180 g of acrylic resin until the mica base is lump free.

Mica Paint Formulation

A mica basecoat paint formulation is prepared by mixing 122.4 g of the pigment dispersion, 70.2 g of the mica base, 20.8 g of a nonaqueous dispersion resin, 30.6 g of melamine resin, 2.6 g of UV screener and 3.5 g of catalyst. The final mica paint is prepared by diluting with xylene to a spray viscosity of 2θ seconds.

Metallic Clear Solution:

A non-aqueous dispersion resin (1353 g), melamine resin (786.2 g), xylene (144.6 g), a UV screener solution (65.6 g) and acrylourethane resin (471.6 g), are added in the order given and mixed thoroughly with an air mixer for 15 minutes. 89.0 g of a premixed solution of an acid catalyst and 90.0 g methanol are added with continued mixing.

Metallic Paint Formulation:

A basecoat paint consisting of 7.1% pigment and 54.4% solids with a pigment to binder ratio of 0.15 is prepared by mixing 35.5 g of the pigment dispersion, 5.1 g aluminum base, 5.3 g nonaqueous dispersion resin and 54.1 g metallic clear solution.

Aluminum panels treated with grey acrylic primer are sprayed with two coats of the basecoat paint to a film thickness of 15–20 microns on a dry film basis. The two sprayings were spaced by a 90 second flash at room temperature. After a flash of 3 minutes, an acrylic clear topcoat is applied by spraying two coats (90 second flash between coats) to a film thickness of 37–50 microns on a dry film basis. The panels are dried for 10 minutes at room temperature and baked at 120° C. for 30 minutes.

The coating is an attractive, intense color with excellent two-tone and high gloss and distinctness of image. Similar attractive panels are obtained using the pigments of Examples 1, 2, 3, 4, 6, 8, 9, 10, 11 and 12 in place of the pigment of Example 5 in the pigment composition of Example 7.

EXAMPLE 14

Water-based paint formulation

Pigment Dispersion

A 1000 ml attritor with 1300 grams of ceramic milling media is charged with 45.5 grams of the pigment composition of Example 7, 45.5 grams of acrylic resin and 259.0 grams of deionized water. The formulation is stirred at 500 rpm for 20 hours to yield a pigment dispersion containing 13% pigment and 26% solids at a pigment to binder ratio of 0.5.

Aluminum Base 40.0 grams of aluminum paste, 10.0 grams of melamine resin and 50.0 grams of butyl cellosolve are mixed until lump free.

Basecoat Paint Formulation

A basecoat paint is prepared by mixing 46.3 grams of the pigment dispersion, 4.3 grams of the aluminum base and a combination of 56.7 grams of a balancing clear and 45.8 grams of a compensating clear, which are mixtures of acrylic and melamine resins. The formulation corresponds to a pigment to binder ratio of 0.25.

Aluminum panels, which are pretreated with a grey acrylic primer, are sprayed with the basecoat paint to an acceptable level of hiding. The basecoat is air dried for 30 minutes and then dried at 106° C. for 15 minutes before clear coating. Two costs of clearcoat are then applied and air dried for 60 minutes before baking at 122° C. for 30 minutes.

The coating exhibits an attractive, intense color with excellent two-tone, high gloss and distinctness of image. Similar coatings are obtained when the pigments of Examples 1, 2, 3, 4, 6, 8, 9, 10, 11 and 12 replace the pigment of Example 5 in the pigment composition of Example 7.

EXAMPLE 15

Example 4 is repeated using 4.8 g of dichloro DPP, 3.2 g of unsubstituted DPP and 2.0 g of unsubstituted quinacridone. The resulting pigment is a mixture of binary solid compound and unsubstituted quinacridone. Unsubstituted quinacridone does not enter into the crystal lattice of the binary solid compound to form a guest-host solid solution.

In addition to the embodiments described above, numerous variations of these embodiments can be made in accordance with this invention.

We claim:

1. A ternary guest-host solid solution which consists of from 70 to 99.9 weight percent of a host, which is a binary solid compound consisting of 35 to 45 weight-percent of 1,4-diketo-3,6-diphenyl-pyrrolo[3,4,-c]pyrrole and 55 to 65 weight-percent of 1,4-diketo-3,6-bis(4-chlorophenyl)-pyrrolo[3,4-c]pyrrole, and from 0.1 to 30 weight-percent of a guest which is a disubstituted quinacridone; wherein the ternary solid solution has a strong peak corresponding to a 2θ double glancing angle of 5.9±0.3 in its x-ray diffraction pattern.

2. A solid solution of claim 1 wherein the x-ray diffraction pattern has peaks corresponding to 2θ double glancing angles of 5.9±0.2, 11.8±0.2, 13.9±0.2, 15.0±0.2, 17.8±0.2, 18.2±0.2, 23.5±0.2, 24.1±0.2 and 27.3±0.2.

3. A solid solution of claim 1 wherein the disubstituted quinacridone is selected from the group consisting of 2,9-dichloroquinacridone, 2,9-difluoroquinacridone and 2,9-dimethylquinacridone.

4. A solid solution of claim 3 which contains from 10 to 25 weight-percent of the 2,9-dichloroquinacridone, 2,9-difluoroquinacridone or 2,9-dimethylquinacridone.

5. A solid solution of claim 4 wherein the binary solid compound consists of about 40 weight-percent of 1,4-diketo-3,6-diphenyl-pyrrolo[3,4-c]pyrrole and about 60 weight-percent of 1,4-diketo-3,6-bis(4-chlorophenyl)-pyrrolo[3,4-c]pyrrole.

6. A solid solution of claim 5 wherein the disubstituted quinacridone is 2,9 dichloroquinacridone.

7. A pigment composition which comprises a ternary guest-host solid solution of claim 1 and at least one additional component selected from the group consisting of an antiflocculating agent, a dispersant, a viscosity-modifying agent and a texture improving agent.

8. A pigment composition of claim 7 wherein the viscosity-modifying agent is a quinacridone sulfonic acid, a diaryldiketopyrrolopyrrole sulfonic acid, a pyrazolylmethylquinacridone, a pyrazolylmethyldiaryldiketopyrrolopyrrole, dimethylaminopropylquinacridone monosulfonamide, dimethylaminopropylquinacridone disulfonamide, phthalimidomethylquinacridone, a phthalimidomethyldiaryldiketopyrrolopyrrole or a salt of the acids or a mixture thereof.

9. A composition of claim 7 wherein the viscosity-modifying agent is a pyrazolylmethylquinacridone, a quinacridone sulfonic acid or a salt or a mixture thereof.

10. A method of coloring a high-molecular-weight organic material which comprises incorporating an effective pigmenting amount of a ternary guest-host solid solution of claim 1 into the high-molecular-weight organic material.

11. A method of claim 10 wherein the high-molecular-weight organic compound is selected from the group consisting of acrylics, alkyds, polyester, polyurethane and combinations thereof.

12. A method of claim 10 wherein the high-molecular-weight organic material is a waterborne paint system.

13. A method of coloring a high-molecular-weight organic material which comprises incorporating an effective pigmenting amount of a pigment composition of claim 7 into the high-molecular-weight organic material.

14. A method of claim 13 wherein the high-molecular-weight organic compound is selected from the group consisting of acrylics, alkyds, polyester, polyurethane or a combination thereof.

15. A method of claim 13 wherein the high-molecular-weight organic material is a waterborne paint system.

16. A method of preparing a ternary guest-host solid solution of claim 1, which comprises dispersion milling a component mixture consisting of 1,4-diketo-3,6-diphenyl-pyrrolo-[3,4-c]pyrrole, 1,4-diketo-3,6-bis(4-chlorophenyl)-pyrrolo-[3,4-c]-pyrrole and a disubstituted quinacridone.

17. A method of preparing a ternary guest-host solid solution of claim 1, which comprises premilling the components of the solid solution, and subsequently subjecting the premilled mixture of the components to a crystal growth step.

18. A binary solid solution which is a binary solid compound consisting of 35 to 45 weight-percent of 1,4-diketo-3,6-diphenyl-pyrrolo[3,4-c]pyrrole and 55 to 65 weight-percent of 1,4-diketo-3,6-bis(4-chlorophenyl)-pyrrolo[3,4-c]pyrrole; wherein the binary solid compound has an x-ray diffraction pattern with strong peaks corresponding to a 2θ double glancing angle of 5.9±0.1.

19. A solid solution of claim 18 wherein the x-ray diffraction pattern has peaks corresponding to 2θ double glancing angles of 5.9±0.1, 11.8±0.1, 13.9±0.1, 15.0±0.1, 17.8±0.1, 18.2±0.1, 23.5±0.1, 24.1±0.1 and 27.3±0.1.

20. A pigment composition which comprises a binary solid solution of claim 18 and at least one additional component selected from the group consisting of an antiflocculating agent, a dispersant, a viscosity-modifying agent and a texture improving agent.

21. A pigment composition of claim 20 wherein the viscosity-modifying agent is a quinacridone sulfonic acid, a diaryldiketopyrrolopyrrole sulfonic acid, a pyrazolylmethylquinacridone,, a pyrazolylmethyldiaryldiketopyrrolopyrrole, dimethylaminopropylquinacridone monosulfonamide, dimethylaminopropylquinacridone disulfonamide, phthalimidomethylquinacridone, a phthalimidomethyldiaryldiketopyrrolopyrrole, or a salt of the acids or a mixture thereof.

22. A method of coloring a high-molecular-weight organic material which comprises incorporating an effective pigmenting amount of a binary solid solution of claim 18 into the high-molecular-weight organic material.

23. A method of coloring a high-molecular-weight organic material which comprises incorporating an effective pigmenting amount of a pigment composition of claim 20 into the high-molecular-weight organic material.

24. A method of preparing a binary solid solution of claim 18, which comprises milling a component mixture consisting of 1,4-diketo-3,6-diphenyl-pyrrolo[3,4-c]pyrrole and 1,4-diketo-3,6-bis(4-chlorophenyl)-pyrrolo[3,4-c]pyrrole.

25. A method of preparing a binary solid solution of claim 18, which comprises premilling the components of the solid solution, and subsequently subjecting the premilled mixture of the components to a crystal growth step.

* * * * *